(12) United States Patent
O'Keefe et al.

(10) Patent No.: US 6,335,067 B1
(45) Date of Patent: Jan. 1, 2002

(54) ADHESIVE TRANSFER DEVICE

(75) Inventors: Robert V. O'Keefe, Stillwater, MN (US); Carl D. Neuburger; Franklin C. Bradshaw, both of Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

(21) Appl. No.: 09/365,751

(22) Filed: Aug. 3, 1999

Related U.S. Application Data

(60) Provisional application No. 60/095,210, filed on Aug. 3, 1998, and provisional application No. 60/130,558, filed on Apr. 22, 1999.

(51) Int. Cl.$^7$ ................. B32B 7/12; C09J 7/02
(52) U.S. Cl. .............. 428/40.1; 428/41.7; 428/41.8; 428/343; 428/355 RA; 428/914
(58) Field of Search .............. 428/40.1, 41.7, 428/41.8, 41.9, 42.1, 343, 355 RA, 914

(56) References Cited

U.S. PATENT DOCUMENTS

| | | |
|---|---|---|
| 2,528,395 A | 10/1950 | Slifkin |
| 2,607,711 A | 8/1952 | Hendricks |
| 2,652,351 A | 9/1953 | Gerhardt |
| 2,914,167 A | 11/1959 | Holtz |
| 3,285,771 A | 11/1966 | Dabroski |
| 3,359,107 A | 12/1967 | Goffe et al. |
| 3,394,799 A | 7/1968 | Ritson et al. |
| 3,464,842 A | 9/1969 | Jackstadt |
| 3,509,991 A | 5/1970 | Hurst |
| 3,671,236 A | 6/1972 | Van Beusekom |
| 3,928,690 A | 12/1975 | Settineri et al. |
| 4,260,659 A | * 4/1981 | Gobran ............... 428/217 |
| 4,331,727 A | 5/1982 | Maas |
| 4,629,634 A | 12/1986 | Coughlan et al. |
| 4,728,380 A | 3/1988 | Jones et al. |
| 4,759,816 A | * 7/1988 | Kasper et al. |
| 4,859,512 A | * 8/1989 | Jones et al. |
| 4,965,113 A | * 10/1990 | Jones et al. |

(List continued on next page.)

FOREIGN PATENT DOCUMENTS

WO   WO 92/19447   11/1992

*Primary Examiner*—Daniel Zirker
(74) *Attorney, Agent, or Firm*—Pillsbury Winthrop LLP

(57) ABSTRACT

The present invention relates to an adhesive transfer device for performing an adhesive transfer operation. The device comprises one or more adhesive transfer sheets. Each of the adhesive transfer sheets comprises a generally flat base substrate providing an adhesive carrying surface, a layer of pressure-sensitive adhesive adhered to the adhesive carrying surface of the base substrate, and a generally flat release liner substrate providing a release surface, the release liner substrate being disposed in covering relation over the adhesive layer with the release surface adhering to the adhesive layer opposite the base substrate. The relative strengths of the adhesive bonding between the adhesive carrying surface and the adhesive layer and the release surface and the adhesive layer are such that the adhesive transfer operation can be initiated by moving the release liner substrate and the base substrate relatively away from one another with the adhesive layer remaining adhered to the adhesive carrying surface of the base substrate and then engaging the selected substrate with a portion of the adhesive layer so as to adhere the selected substrate to the adhesive layer portion. The strength of the adhesive bonding between the adhesive layer and the adhesive carrying surface is such that, after the selected substrate has been engaged with and adhered to the portion of the adhesive layer, the adhesive transfer operation can be completed by moving the selected substrate and the base substrate relatively away from one another with the aforesaid portion of the adhesive layer remaining adhered to the selected substrate, thereby allowing the selected substrate to be adhered to a desired surface by engaging the portion of the adhesive layer thereon with the desired surface.

28 Claims, 4 Drawing Sheets

U.S. PATENT DOCUMENTS 5,135,798 A * 8/1992 Muschter et al.
5,192,612 A * 3/1993 Otter et al. .................. 428/355
5,296,277 A * 3/1994 Wilson et al.
5,318,825 A * 6/1994 Naber
5,401,547 A * 3/1995 Blackwell et al.
5,558,913 A * 9/1996 Sasaki et al.
5,665,446 A * 9/1997 Sundet
5,691,022 A * 11/1997 Knauf
5,705,243 A * 1/1998 Mehta et al.
5,735,998 A * 4/1998 Bradshaw
5,795,636 A * 8/1998 Keller et al.
5,876,817 A * 3/1999 Matina et al.

* cited by examiner

ADHESIVE TRANSFER DEVICE

The present application claims priority to U.S Provisional Application of O'Keefe et al., Ser. No. 60/095,210, filed Aug. 3, 1998, and U.S. Provisional Application of Neuburger, Ser. No. 60/130,558, filed Apr. 22, 1999, the entirety of each being incorporated into the present application by reference.

FIELD OF THE INVENTION

The present invention relates to adhesive transfer devices for making adherable substrates. More particularly, the present invention relates to an adhesive transfer sheet for making adherable substrates and a tablet or package including a plurality of such sheets.

BACKGROUND AND SUMMARY OF THE INVENTION

It is oftentimes desirable to turn an existing, nonadherable substrate into an adherable substrate (i.e., a sticker or label) for adherence to a contact surface. For example, in arts and crafts fields and school projects, one may desire to take a substrate, such as a photograph, and adhere it to a posterboard or other such surface for creating a visual aid for presentations or a decorative collage.

Conventionally, to create an adherable substrate from an existing substrate, one has to apply liquid adhesive to the back of the substrate using spray bottles or brushes. These are somewhat undesirable because spots on the substrate can be easily missed during application. Also, spillage of the liquid adhesive can be problematic because the inherently tacky nature of most adhesives makes them difficult to remove without using a solvent. As an alternative, solid glue sticks have been provided. These glue sticks obviate the spillage potential associated with liquid adhesives, but require careful attention during application to ensure that no spots on the substrate are missed.

To overcome the shortcomings of these conventional adhesive transfer methods, Xyron, Inc., the assignee of the present application, has developed apparatuses capable of performing both laminating and adhesive transfer operations. Early examples of Xyron's apparatuses are disclosed in U.S. Pat. Nos. 5,580,417 and 5,584,962. These apparatuses have proven to be quite effective at performing adhesive transfer operations without the spillage and other problems associated with the above-described conventional methods.

Purchasing an entire Xyron apparatus, however, is not a cost-effective option for the consumer who only wants to perform a limited number of adhesive transfer operations. Accordingly, there exists a need for an adhesive transfer device that obviates the problems described above with respect to manual methods, yet has a significantly lower cost than the apparatuses mentioned above.

To meet this need, the present invention provides an adhesive transfer device for performing an adhesive transfer operation. The device comprises one or more adhesive transfer sheets. Each of the adhesive transfer sheets comprises a generally flat base substrate providing an adhesive carrying surface, a layer of pressure-sensitive adhesive adhered to the adhesive carrying surface of the base substrate, and a generally flat release liner substrate providing a release surface, the release liner substrate being disposed in covering relation over the adhesive layer with the release surface adhering to the adhesive layer opposite the base substrate. The relative strengths of the adhesive bonding between the adhesive carrying surface and the adhesive layer and the release surface and the adhesive layer are such that the adhesive transfer operation can be initiated by moving the release liner substrate and the base substrate relatively away from one another with the adhesive layer remaining adhered to the adhesive carrying surface of the base substrate and then engaging the selected substrate with a portion of the adhesive layer so as to adhere the selected substrate to the adhesive layer portion. The strength of the adhesive bonding between the adhesive layer and the adhesive carrying surface is such that, after the selected substrate has been engaged with and adhered to the portion of the adhesive layer, the adhesive transfer operation can be completed by moving the selected substrate and the base substrate relatively away from one another with the aforesaid portion of the adhesive layer remaining adhered to the selected substrate, thereby allowing the selected substrate to be adhered to a desired surface by engaging the portion of the adhesive layer thereon with the desired surface.

Preferably, the individual sheets can be sold packaged together or bound in tablet form in units of 10, 25, 50, or any other suitable amount.

In accordance with a further aspect of the invention, each sheet includes the base substrate, the layer of pressure-sensitive adhesive on the base substrate, and a dual-function substrate that performs the role of both the adhesive mask surface and the release liner surface. Specifically, one side (the release surface) of the dual-function substrate is coated with a release material, such as silicone, and the other side (the mask surface) is left uncoated. Before use, the dual-function substrate covers the adhesive layer with the release surface engaging the adhesive layer. To perform the adhesive operation, the dual-function substrate is peeled back and the selected substrate is pressed against the adhesive layer. Then, the dualfunction substrate is flipped and placed over the selected substrate and any portions of the adhesive layer exposed around the periphery of the selected substrate. As a result, any adhesive exposed around the periphery of the selected substrate bonds to the mask surface and then the dual-function substrate can be pulled back and discarded.

The device constructed in accordance with this further aspect of the invention is easier and less expensive to make because two functions are combined into a single substrate. Preferably, the dual-function substrate is a 1 mm thick PET film. This film thickness has been found to have the combination of the appropriate stiffness for manual handling and the appropriate flexibility for conforming to the edges of most thin substrates to ensure that the adhesive directly adjacent the substrates peripheral edge bonds to the mask surface.

Other objects, features, and advantages of the present invention will become apparent from the following detailed description, the accompanying drawings, and the appended claims.

DETAILED DESCRIPTION OF THE PREFERRED EMBODIMENTS OF THE INVENTION

Figure 1:
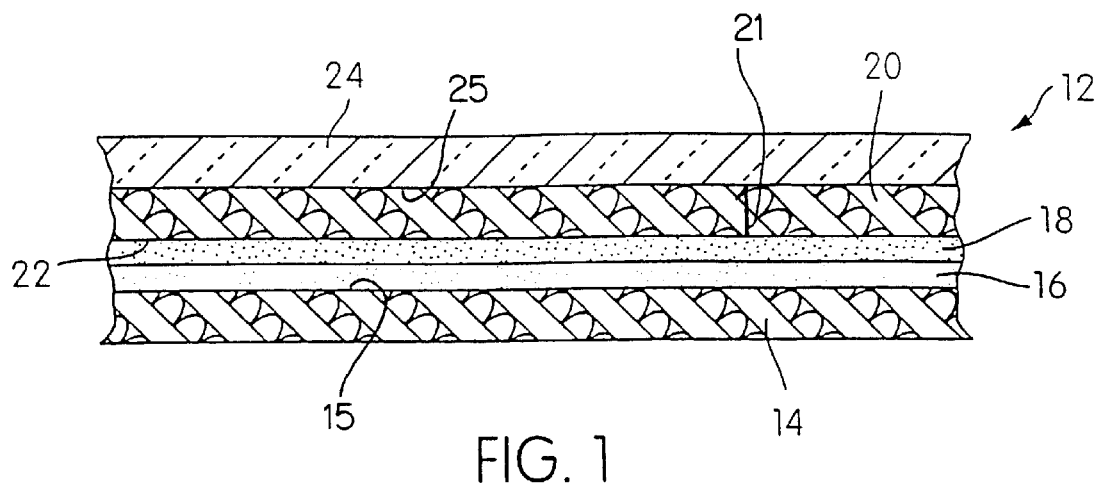
FIG. 1 is a cross-sectional view of an individual adhesive transfer sheet designed in accordance with the principles of the present invention.
Figure 2:
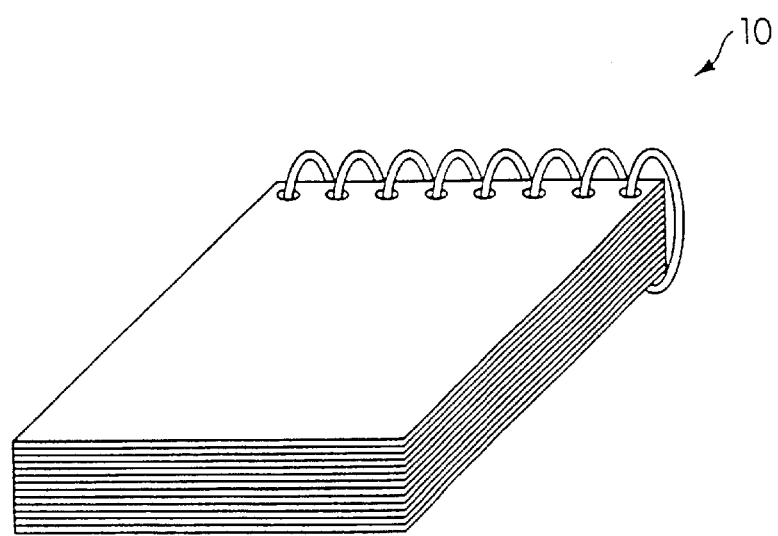
FIG. 2 is a perspective view of an adhesive transfer tablet comprising a plurality of the individual adhesive transfer sheets shown in FIG. 1.

FIGS. 1–5 illustrate an adhesive transfer device in the form of an adhesive transfer tablet, generally indicated 10, embodying the principles of the present invention. FIG. 2 shows a perspective view of the tablet 10. Basically, the tablet 10 includes a plurality of adhesive transfer sheets, generally indicated at 12, bound together in a conventional fashion. Such binding may include a spiral binding, adhesive binding, or any other arrangement by which a plurality of individual sheets can be bound together. Alternatively, the individual sheets may be packaged together in plastic wrap, a box, or other suitable packaging.

FIG. 1 illustrates a cross-section of an individual adhesive transfer sheet 12. The scaling of the cross-sectional view is exaggerated in order to more clearly illustrate the principles of the present invention. The sheet 12 comprises a base substrate 14, which may be paper or a plastic sheet, with an adhesive carrying surface 15. A layer of repositionable adhesive material 16 is coated on the adhesive carrying surface 15 of the base substrate 14. The layer of repositionable adhesive material 16 is formed from an adhesive which does not set or take a permanent adhesive bonding over time. One such adhesive is formed from pressure-sensitive adhesive microspheres. However, any suitable repositionable adhesive material may be used to form the layer of repositionable adhesive material 16.

A layer of permanent adhesive material 18 is disposed on the layer of repositionable adhesive material 16 so that the entire layer 16 is covered. The layer of permanent adhesive material 18 is formed from an adhesive which has relatively strong and durable bonding qualities suitable for extended periods of use. It is to be understood that such suitable materials may include an acrylic emulsion adhesive, a rubber-based adhesive, or any other suitable material exhibiting such durable bonding qualities.

A release liner 20 having a release surface 22 is disposed adjacent the layer of permanent adhesive material 18 with the release surface 22 engaging the layer 18. The release liner 20 may be a regular release liner or a differential release liner. A regular release liner has both sides thereof treated so as to have a low affinity for allowing adhesives to bond thereto; a differential release liner has only one side thereof treated in such a manner. Such treatment usually comprises coating the release liner surface(s) with silicone or another suitable low friction material. Typically, either type of release liner may be constructed from paper or a synthetic material. Regardless of whether the release liner 20 is of the differential or regular type, the release surface 22 is provided with a relatively poor affinity for bonding with adhesive materials to thereby allow the release liner 20 to be disposed in covering relation over the layer of permanent adhesive material 18, yet be easily removed from the adhesive transfer sheet 12 without removing the adhesive layers 16, 18 from the base substrate's adhesive carrying surface 15. A transversely extending score line 21 may be provided through the release liner 20 to facilitate removal thereof.

Finally, an adhesive mask in the form of a transparent plastic sheet 24 is disposed over the release liner 20. The transparent plastic sheet 24 has a mask surface 25 with a relatively higher affinity for adhesive bonding in comparison to the release surface 22 of the release liner 20. When the release liner 20 is moved out of covering relation with respect to the layer of permanent adhesive material 18 and separated from the adhesive transfer sheet 12, the mask surface of the plastic sheet 24 can be moved into direct contact with the layer of permanent adhesive material 18. As a result, the layer of permanent adhesive material 18 bonds to the mask surface 25 of the sheet 24. Pressure may be applied to the sheet 24 in order to enhance such bonding. The plastic sheet 24 may then be peeled back so as to remove both layers of adhesive material 16, 18 from the adhesive carrying surface 15 of the base substrate 14.

It is within the principles of the present invention to use any other material (e.g. paper, fabric, etc.) to which the layer of permanent adhesive material 18 will adhere in place of the plastic sheet 24. The transparent plastic sheet 24 is preferable simply so that a user may view the master 26 during the adhesive transfer operation.

It is to be understood that the layers of adhesive material 16,18 may be formed by either one of two processes. In the first of the two processes, the layer of permanent adhesive material 18 is coated on the release surface 22 of the release liner 20 and the layer of repositionable adhesive 16 is coated on the adhesive carrying surface 15 of the base substrate 14. The base substrate 14 and the release liner 20 are then put together so as to bring the layer of permanent adhesive material 18 into adhesive contact with the layer of repositionable adhesive material 16. In the second of the two processes, the layer of repositionable material 16 is coated on the adhesive carrying surface of the base substrate 14 and then the layer of permanent adhesive material 18 is coated on the layer of repositionable adhesive material 16. The release liner 20 is then disposed on the layer of permanent adhesive material 18 so as to cover the entire layer with the release surface 22 thereof engaging the permanent adhesive layer 18.

This adhesive transfer sheet 12 designed in accordance with the principles of the present invention is used to perform an adhesive transfer operation on a master 26. In the figures, the master 26 (also referred to a selected substrate) illustrated is simply a blank paper card. However, it is contemplated that a wide variety of masters may be used with the adhesive transfer sheets of the present invention. For example, it may be desirable to perform an adhesive transfer operation on business cards, office supplies, holiday decorations, school projects, arts and crafts projects, etc.

Figure 3:
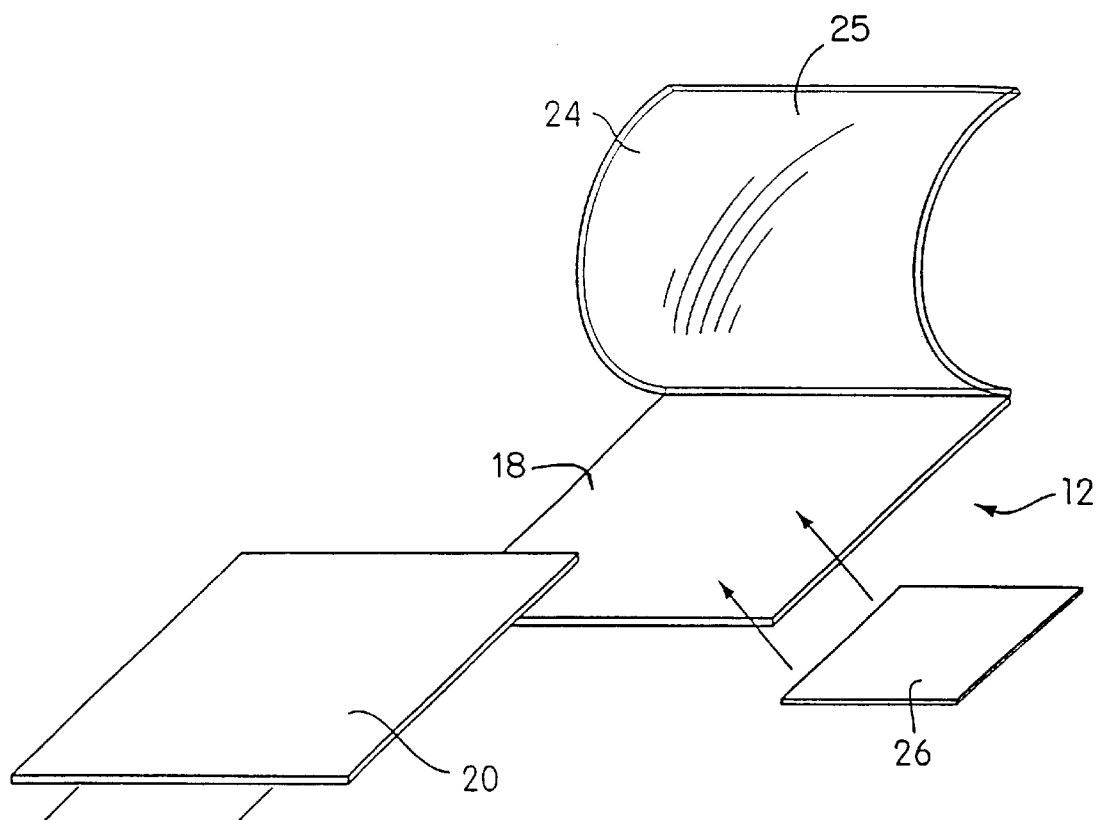
FIG. 3 is a perspective view of the individual adhesive transfer sheet of FIG. 1 with an adhesive mask in the form of a transparent plastic sheet peeled back and the release liner thereof being removed.
Figure 4:
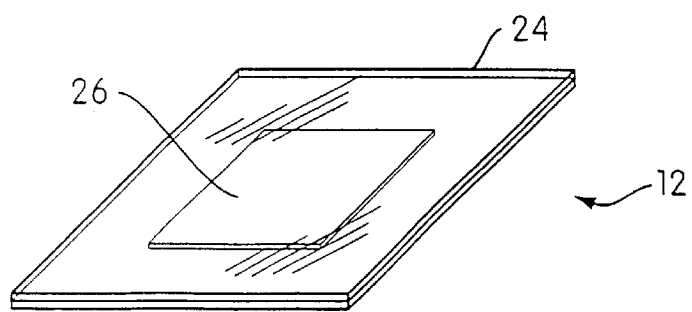
FIG. 4 is a perspective view of the individual adhesive transfer sheet of FIG. 1 with a master positioned thereon for an adhesive transfer operation and the transparent plastic sheet moved back into covering relation.

To initiate the adhesive transfer operation, the transparent plastic sheet 24 is peeled back away from the release liner 20, as shown in FIG. 3, and the release liner 20 is moved away from the base substrate 14 so as to leave the adhesive material 16, 18 adhered to the adhesive carrying surface 15. The adhesive materials 16, 18 remain adhered to the adhesive carrying surface 15 as a result of the bond strength between the permanent adhesive 18 and the release surface 22 being weaker than the bond between the repositionable adhesive 16 and the adhesive carrying surface 15. The master 26 engaged with the layer of permanent adhesive material 18 and the transparent plastic sheet 24 is moved into covering relation over both the master 26 and the layer of permanent adhesive material 18 (FIG. 4). Pressure is then applied to the sheet 24 to ensure that the layer of permanent adhesive material 18 and the master 26 are adequately bonded and that any portions of the permanent adhesive layer exposed around the periphery of the master 26 are adequately bonded to the mask surface 25 of the sheet 24.

Figure 5:
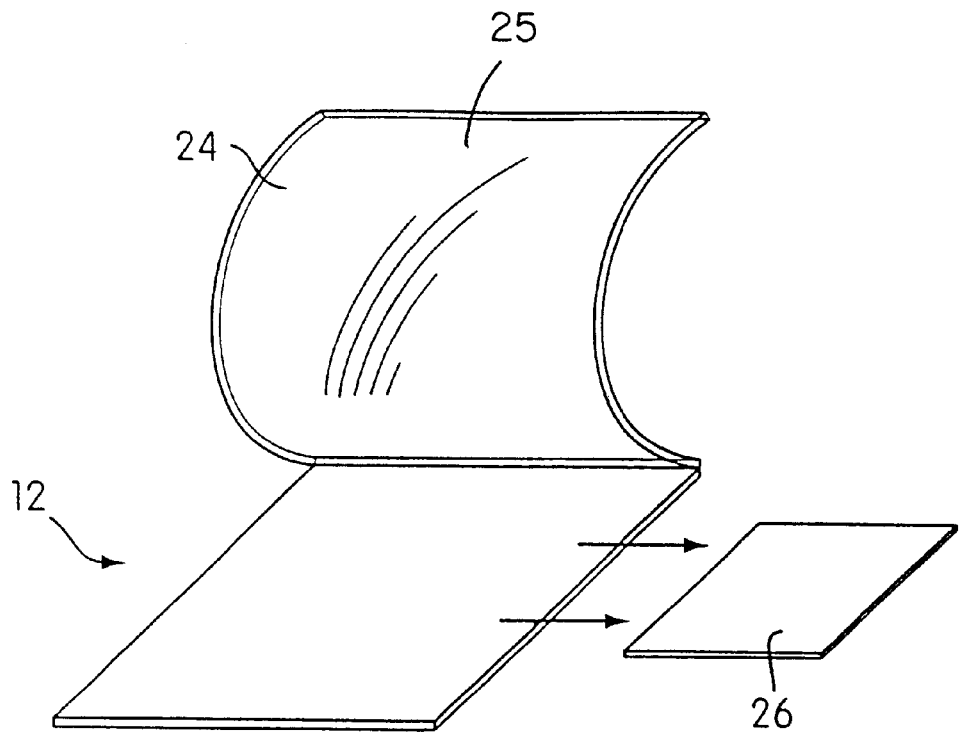
FIG. 5 is a perspective view of the individual adhesive transfer sheet of FIG. 1 with transparent plastic sheet peeled back out of covering relation and the master removed after the adhesive transfer operation has been performed.

The next step is to peel the transparent plastic sheet 24 back away from the master 26 and the layer of permanent adhesive material 18 (FIG. 5). As the transparent plastic sheet 24 is peeled back, the portions of the layer of permanent adhesive material 18 not covered by the master 26 remain adhered to the plastic sheet 24 and are removed or "stripped" away from the base substrate 14 along with the corresponding portions of the layer of repositionable adhesive material 16 bonded therewith. This occurs as a result of the bond between both the adhesive layers 16 and 18 and the mask surface 25 and the permanent adhesive layer 18 being stronger than the bond between the repositionable adhesive 16 and the adhesive carrying surface 15.

The transparent plastic sheet 24 can then be discarded along with the layers of permanent and repositionable adhesive material 16,18 adhered thereto. Finally, the master 26 may then be removed from the base substrate 14. The layer of permanent adhesive material 18 remains adhered to the surface of the master 26 and the corresponding portions of the repositionable adhesive material 16 remain bonded to the permanent adhesive material 18 as the master 26 is removed from the base substrate 14. This likewise occurs as a result of the bond between both the adhesive layers 16 and 18 being stronger than the bond between the respositionable adhesive 16 and the adhesive carrying surface 15. The master 26 may then be removably adhered to desired surfaces and then be removed and repositioned so as to be removably adhered to other desired surfaces a number of times.

The use of an adhesive mask (i.e., plastic sheet 24) is particularly advantageous in that it 'strips' away all of the adhesive material from the base substrate 14. The mask can then be crumpled up and discarded without unnecessarily getting adhesive material on the hands of the user. This 'stripping' feature enhances the adhesive transfer process and makes it an easy, clean, and simplified operation.

Figure 6:
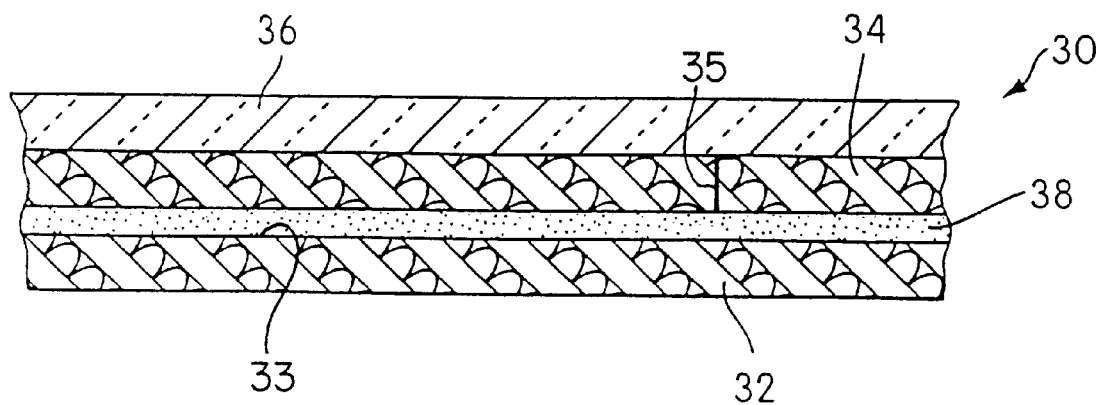
FIG. 6 is a cross-sectional view of a second embodiment of an adhesive transfer sheet designed in accordance with the principles of the present invention.

Referring now to FIG. 6, there is shown therein an individual adhesive transfer sheet 30 embodying the principles of the present invention. Like the adhesive transfer sheet 12 described above and utilized with repositionable adhesive material, the sheet 30 of the second embodiment comprises a base substrate 32 with an adhesive carrying surface 33, a release liner 34 with a transversely extending score line 35 and a release surface, and an adhesive mask in the form of a transparent plastic sheet 36 with a mask surface. However, instead of applying two layers of adhesive material to the base substrate 32, only a layer of permanent adhesive material 38 is applied to the adhesive carrying surface of the base substrate 32. Preferably, the adhesive carrying surface of the base substrate 32 has release characteristics similar to the release liner 34 so as to prevent the permanent adhesive material 38 from permanently bonding on the substrate 32. In contrast, the adhesive carrying surface 15 on the release liner 14 in the previous embodiment may or may not have been treated because the nature of the repositionable adhesive 16 will allow the layers to be removed from the adhesive carrying surface 15 with greater ease than a permanent adhesive.

The adhesive transfer operation is essentially the same in that the sheet 36 is peeled back and the release liner 34 is removed. Then the master is placed on top of the layer of permanent adhesive material 38 and the sheet 36 is moved back into covering relation with respect to the layer of permanent adhesive material 38. Pressure is applied to the portion of the sheet 36 covering the master to ensure the adhesive is adequately adhered and the sheet 36 is then peeled back so as to 'strip' away the permanent adhesive material 38 from the base substrate 32. The master can then be removed and permanently adhered to a contact surface as desired. As with the previous embodiment, the sheet 36 with all the extra permanent adhesive can now be crumpled up and discarded.

Figure 7:
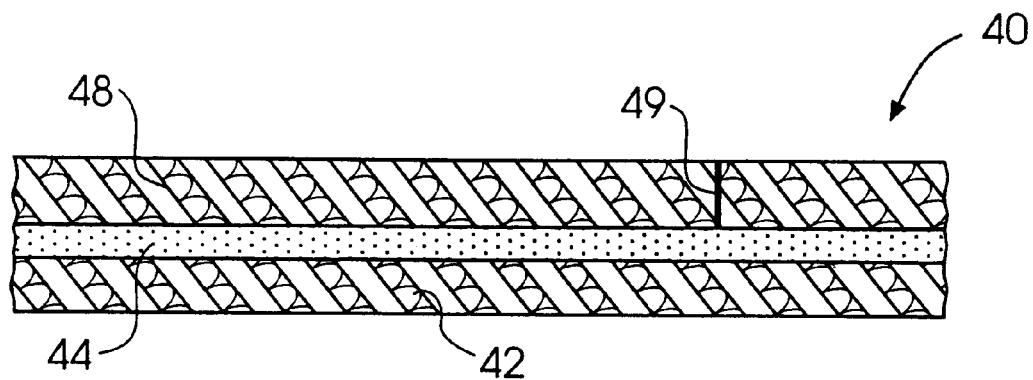
FIG. 7 is a cross-sectional view of a third embodiment of an adhesive transfer sheet designed in accordance with the principles of the present invention.

Referring now to FIG. 7, there is shown therein a third embodiment of an individual adhesive transfer sheet 40 embodying the principles of the present invention. The adhesive transfer sheet 40 of the third embodiment is similar to the sheet 20 of the second embodiment, except that no adhesive mask is provided. The sheet 40 simply comprises a base substrate 42, a layer of permanent adhesive material 44 coated on the adhesive carrying surface of the base substrate 44, and a release liner 48 (either regular or differential) with a release surface engaging the layer of permanent adhesive material 44. The release liner 48 has a score line 49 extending transversely thereacross in order to facilitate its removal from the sheet 40. The base substrate 42 is basically another differential or regular release liner like liner 48 which ensures that the layer of permanent adhesive material will not permanently bond to the substrate 42. In order to perform the adhesive transfer operation, the release liner 48 is peeled back away from the layer of permanent adhesive material 44. A master (not shown) can then be placed on top of the layer of permanent adhesive material 44.

An adhesive mask (not shown), which does not constitute an element of this third embodiment, may then be optionally disposed over the sheet 40 so as to cover the master and the entire layer of permanent adhesive material 44. The mask can be any substrate having an affinity for adhesive materials, whether it be a sheet of paper, clear plastic material, or any other such material. Pressure can be applied to the mask and to ensure adequate bonding, and then the mask can be peeled back so as to strip away all of the permanent adhesive 44 not covered by the master. All that remains on the base substrate 42 is the master with a portion of the permanent adhesive material 44 bonded thereto. The master can then be removed, along with the permanent adhesive material, and be permanently adhered to a desired surface. However, the adhesive transfer operation may be performed without an adhesive mask and the master may simply be peeled off the base substrate without removing the adhesive exposed around its periphery.

Figure 8:
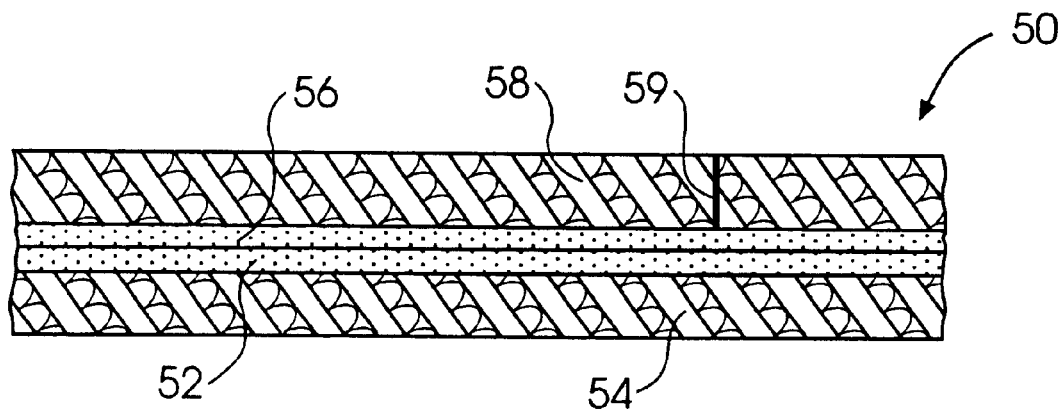
FIG. 8 is a cross-sectional view of a fourth embodiment of an adhesive transfer sheet designed in accordance with the principles of the present invention.

Referring now to FIG. 8, there is shown therein a fourth embodiment of an adhesive transfer sheet 50 embodying the principles of the present invention. The sheet 50 of the fourth embodiment is similar to the sheet 40 of the third embodiment in all respects except that a layer of repositionable adhesive material 52 is disposed between the base substrate 54 and the layer of permanent adhesive material 56. As before, a release liner 58 with a score line 59 covers the layer of permanent adhesive material 56 and no mask is provided. However, because the repositionable material 52, rather than the permanent adhesive material 56, is disposed adjacent the base substrate 54, it is not necessary to provide the base substrate 54 with the same characteristics as a release liner because the nature of repositionable adhesive material will prevent it from permanently bonding thereto.

Figure 9:
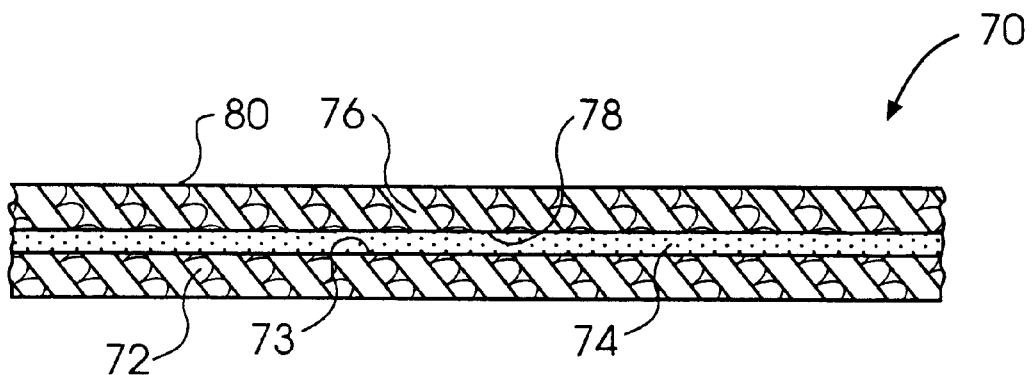
FIG. 9 is a cross-sectional view of a fifth embodiment of an adhesive transfer sheet designed in accordance with the principles of the present invention.

FIG. 9 shows yet another adhesive transfer sheet 70 designed of the present invention. As with the previous embodiments, the embodiment of FIG. 9 has a base substrate 72 with an adhesive carrying surface, a layer of permanent adhesive material 74 coated on the adhesive carrying surface 73, and a dual-function substrate 76 in the form of a differential release liner. The dual-function substrate 76 has a release surface 78 provided with a release coating and a mask surface 80 that has a higher affinity for adhesive bonding than the release surface 78.

To use the sheet 70 of FIG. 9, the dual-function substrate 76 is peeled back from the base substrate 72 so as to leave the permanent adhesive layer 74 on the adhesive carrying surface 73. This occurs as a result of the bond strength between the adhesive layer 74 and the carrying surface 73 being stronger than the bond strength between the adhesive layer 74 and the release surface 78. More specifically, this occurs as a result of the release surface being treated with more release coating (such as silicone or the like) than the adhesive carrying surface 73 so as to provide the release surface 78 with a lower affinity for adhesive bonding than the carrying surface 73.

Then, the master is engaged with the adhesive layer 74 so as to effect adhesive bonding therebetween. The dual-function substrate 76 is flipped over and placed over both the master and the base substrate 72 with the mask surface 80 engaging any portions of the adhesive layer exposed around the periphery of the master. Then, the dual-function substrate 76 is peeled back to strip away the portions of the adhesive 72 exposed around the periphery of the master. Finally, the master can be peeled away from the base substrate 72, taking the adhesive along with it, and contacted with a desired surface for adherence thereto.

The preferred dual-function substrate is a 1 mm thick PET film that has been coated with silicone or another suitable low-friction material on the release surface thereof and has the mask surface thereof untreated. Although other materials and thicknesses could be used, the 1 mm thick PET film is preferred because it has both (a) the appropriate flexibility to conform to the edges of the master so as to pick up the adhesive immediately adjacent the peripheral edges and (b) the appropriate stiffness to be manually handled.

These individual adhesive transfer sheets designed in accordance with the principles of the present invention offer a quick, easy, and inexpensive means for performing an adhesive transfer operation to create a repositionably or permanently adherable master. These individual sheets can be produced relatively inexpensively and sold in varying quantities (i.e., tablets of 10, 25, 50, etc.) to meet the needs of various users. Such tablets offer an inexpensive option to purchasing an adhesive transfer machine for those who only desire to perform a limited number of adhesive transfer operations. These tablets also offer a cleaner and easier option to using liquid adhesive materials, adhesive tape, glue sticks, etc. in order to create home-made repositionable substrates.

It will be understood that the foregoing description is a specific and preferred embodiment of the present invention and is intended to illustrate the structural and functional principles of the present invention. Other variations and modifications may be made to these specific embodiments without departing from the scope of the appended claims. For example, the principles of the present invention may be used to transfer a removable adhesive to a master, rather than only the permanent and repositionable adhesives mentioned above.

What is claimed:

1. An adhesive transfer device for performing an adhesive transfer operation on a selected substrate, said device comprising:

one or more adhesive transfer sheets, each of said adhesive transfer sheets comprising:

a generally flat base substrate providing an adhesive carrying surface, a layer of pressure-sensitive adhesive adhered to the adhesive carrying surface of said base substrate, a generally flat release liner substrate providing a release surface, said release liner substrate being disposed in covering relation over said adhesive layer with said release surface adhering to the adhesive layer opposite said base substrate, the relative strengths of the adhesive bonding between said adhesive carrying surface and said adhesive layer and said release surface and said adhesive layer being such that the adhesive transfer operation can be initiated by moving said release liner substrate and said base substrate relatively away from one another with said adhesive layer remaining adhered to the adhesive carrying surface of said base substrate and then engaging the selected substrate with a portion of said adhesive layer so as to adhere said selected substrate to said adhesive layer portion, the strength of the adhesive bonding between said adhesive layer and said adhesive carrying surface being such that, after the selected substrate has been engaged with and adhered to said portion of said adhesive layer, the adhesive transfer operation can be completed by moving the selected substrate and the base substrate relatively away from one another with the aforesaid portion of the adhesive layer remaining adhered to said selected substrate, thereby allowing the selected substrate to be adhered to a desired surface by engaging the portion of the adhesive layer thereon with the desired surface.

2. An adhesive transfer device according to claim 1, wherein said adhesive transfer sheet further comprises:

a substrate portion providing a mask surface, said mask surface having an affinity for adhesive bonding selected so that, when the selected substrate is engaged with and adhered to said portion of said adhesive layer during the aforesaid adhesive transfer operation in such a manner that peripheral portions of said adhesive layer are exposed around the periphery of the selected substrate, said substrate portion can be disposed in covering relation over both the selected substrate and said exposed adhesive layer portions in such a manner to affect adhesive bonding between said mask surface and said exposed adhesive layer portions and then said substrate portion and said base substrate can be moved relative to one another with the exposed portions of said adhesive layer remaining adhered to said mask surface.

3. An adhesive transfer device according to claim 2, wherein the substrate portion providing said mask surface is a portion of a mask substrate that is separate from said release liner substrate.

4. An adhesive transfer device according to claim 2, wherein said mask substrate is a thin plastic film.

5. An adhesive transfer device according to claim 4, wherein said plastic film is about 1 mm thick.

6. An adhesive transfer device according to claim 5, wherein said plastic film is PET.

7. An adhesive transfer device according to claim 2, wherein the substrate portion that provides said mask surface is a portion of said release liner substrate opposite said release surface thereof.

8. An adhesive transfer substrate according to claim 7, wherein said release liner substrate is a plastic film.

9. An adhesive transfer device according to claim 8, wherein said plastic film is about 1 mm thick.

10. An adhesive transfer substrate according to claim 8, wherein said plastic film is PET.

11. An adhesive transfer device according to claim 1, wherein said one or more adhesive transfer sheets comprises a plurality of said adhesive transfer sheets packaged together.

12. An adhesive transfer device according to claim 11, wherein said adhesive transfer sheets are bound together at the ends thereof.

13. An adhesive transfer device according to claim 2, wherein said one or more adhesive transfer sheets comprises a plurality of said adhesive transfer sheets packaged together.

14. An adhesive transfer device according to claim 13, wherein said adhesive transfer sheets are bound together at the ends thereof.

15. An adhesive transfer device according to claim 3, wherein said one or more adhesive transfer sheets comprises a plurality of said adhesive transfer sheets packaged together.

16. An adhesive transfer device according to claim 15, wherein said adhesive transfer sheets are bound together at the ends thereof.

17. An adhesive transfer device according to claim 7, wherein said one or more adhesive transfer sheets comprises a plurality of said adhesive transfer sheets packaged together.

18. An adhesive transfer device according to claim 17, wherein said adhesive transfer sheets are bound together at the ends thereof.

19. An adhesive transfer device according to claim 1, wherein said release surface is coated with silicone.

20. An adhesive transfer device according to claim 7, wherein said release surface is coated with silicone.

21. An adhesive transfer device according to claim 1, wherein said layer of pressure-sensitive adhesive consists essentially of a permanent pressure-sensitive adhesive.

22. An adhesive transfer device according to claim 1, wherein said layer of pressure-sensitive adhesive comprises a layer of removable pressure-sensitive adhesive coated on the adhesive carrying surface of said base substrate and a layer of permanent pressure-sensitive adhesive coated over said layer of removable pressure-sensitive adhesive.

23. In combination with a selected substrate, an adhesive transfer device for performing an adhesive transfer operation on said selected substrate, said device comprising:

an adhesive transfer device for performing an adhesive transfer operation on a selected substrate, said device comprising:

one or more adhesive transfer sheets, each of said adhesive transfer sheets comprising:

a generally flat base substrate providing an adhesive carrying surface, a layer of pressure-sensitive adhesive adhered to the adhesive carrying surface of said base substrate, a generally flat release liner substrate providing a release surface, said release liner substrate being disposed in covering relation over said adhesive layer with said release surface adhering to the adhesive layer opposite said base substrate, the relative strengths of the adhesive bonding between said adhesive carrying surface and said adhesive layer and said release surface and said adhesive layer being such that the adhesive transfer operation can be initiated by moving said release liner substrate and said base substrate relatively away from one another with said adhesive layer remaining adhered to the adhesive carrying surface of said base substrate and then engaging the selected substrate with a portion of said adhesive layer so as to adhere said selected substrate to said adhesive layer portion, the strength of the adhesive bonding between said adhesive layer and said adhesive carrying surface being such that, after the selected substrate has been engaged with and adhered to said portion of said adhesive layer, the adhesive transfer operation can be completed by moving the selected substrate and the base substrate relatively away from one another with the aforesaid portion of the adhesive layer remaining adhered to said selected substrate, thereby allowing the selected substrate to be adhered to a desired surface by engaging the portion of the adhesive layer thereon with the desired surface.

24. A combination according to claim 23, wherein said adhesive transfer sheet further comprises:

a substrate portion providing a mask surface, said mask surface having an affinity for adhesive bonding selected so that, when the selected substrate is engaged with and adhered to said portion of said adhesive layer during the aforesaid adhesive transfer operation in such a manner that peripheral portions of said adhesive layer are exposed around the periphery of the selected substrate, said substrate portion can be disposed in covering relation over both the selected substrate and said exposed adhesive layer portions in such a manner to affect adhesive bonding between said mask surface and said exposed adhesive layer portions and then said substrate portion and said base substrate can be moved relative to one another with the exposed portions of said adhesive layer remaining adhered to said mask surface.

25. A combination according to claim 24, wherein the substrate portion providing said mask surface is a portion of a mask substrate that is separate from said release liner substrate.

26. A combination according to claim 24, wherein the substrate portion that provides said mask surface is a portion of said release liner substrate opposite said release surface thereof.

27. A method performing an adhesive transfer operation on a selected substrate, said method comprising:

providing an adhesive transfer sheet comprising:

a generally flat base substrate providing an adhesive carrying surface;

a layer of pressure-sensitive adhesive adhered to the adhesive carrying surface of said base substrate, and a generally flat release liner substrate providing a release surface, said release liner substrate being disposed in covering relation over said adhesive layer with said release surface adhering to the adhesive layer opposite said base substrate;

moving said release liner substrate and said base substrate relatively away from one another with said adhesive layer remaining adhered to the adhesive carrying surface of said base substrate;

then engaging the selected substrate with a portion of said adhesive layer so as to adhere said selected substrate to said adhesive layer portion; and then moving the selected substrate and the base substrate relatively away from one another with the aforesaid portion of the adhesive layer remaining adhered to said selected substrate, thereby allowing the selected substrate to be adhered to a desired surface by engaging the portion of the adhesive layer thereon with the desired surface.

28. A method according to claim 27, wherein said adhesive transfer sheet further comprises a substrate portion providing a mask surface, said method further comprising:

disposing said substrate portion in covering relation over both the selected substrate and said exposed adhesive layer portions in such a manner to affect adhesive bonding between said mask surface and said exposed adhesive layer portions, and then moving said substrate portion and said base substrate apart from one another with the exposed portions of said adhesive layer remaining adhered to said mask surface.

* * * * *